(12) United States Patent
Abercrombie et al.

(10) Patent No.: US 11,681,664 B2
(45) Date of Patent: Jun. 20, 2023

(54) JOURNAL PARSING FOR OBJECT EVENT GENERATION

(71) Applicant: EMC IP Holding Company LLC, Hopkinton, MA (US)

(72) Inventors: John Abercrombie, Seattle, WA (US); Grigorii Skripko, Bellevue, WA (US); Sumith Chandra Reddy Nimmala, Seattle, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/378,278

(22) Filed: Jul. 16, 2021

(65) Prior Publication Data

US 2023/0018769 A1   Jan. 19, 2023

(51) Int. Cl.
*G06F 16/18* (2019.01)
*G06F 16/23* (2019.01)

(52) U.S. Cl.
CPC ...... *G06F 16/1805* (2019.01); *G06F 16/2358* (2019.01)

(58) Field of Classification Search
CPC .............. G06F 16/18–1815; G06F 16/2358
See application file for complete search history.

(56) References Cited

U.S. PATENT DOCUMENTS

| | | | | |
|---|---|---|---|---|
| 9,477,691 | B1* | 10/2016 | Reiner | G06F 16/2282 |
| 11,487,714 | B2* | 11/2022 | Beier | G06F 16/178 |
| 2002/0138559 | A1* | 9/2002 | Ulrich | G06F 16/10 |
| | | | | 711/114 |
| 2011/0252099 | A1* | 10/2011 | Pattekar | G06F 16/2365 |
| | | | | 709/204 |
| 2013/0346365 | A1* | 12/2013 | Kan | H04L 67/1095 |
| | | | | 707/610 |
| 2019/0179554 | A1* | 6/2019 | Pioch | G06F 3/064 |

* cited by examiner

*Primary Examiner* — Tamara T Kyle
*Assistant Examiner* — Michal Bogacki
(74) *Attorney, Agent, or Firm* — Amin, Turocy & Watson, LLP

(57) ABSTRACT

A system can register a first client and a second client to respectively receive information about updates to a write-ahead log structured storage engine that comprises a log. The system can read an entry in the log, the entry being of an update type. The system can, in response to determining that the first client is registered to receive at least some of the information about updates that are of the update type, sending, to the first client, entry information about the entry. The system can, in response to determining that the second client is registered to receive information about updates that are of the update type, sending, to the second client, the entry information about the entry.

20 Claims, 10 Drawing Sheets

500

(502)

REGISTER A GROUP OF COMPONENTS TO RECEIVE UPDATE INFORMATION ABOUT UPDATES TO A LOG STRUCTURED STORAGE ENGINE THAT COMPRISES A LOG 504

PARSE AN ENTRY IN THE LOG, THE ENTRY MATCHING A CRITERION 506

IN RESPONSE TO DETERMINING THAT A FIRST COMPONENT OF THE GROUP OF COMPONENTS IS REGISTERED TO RECEIVE AT LEAST PART OF THE INFORMATION ABOUT UPDATES THAT MATCH THE CRITERION, SEND ENTRY INFORMATION ABOUT THE ENTRY TO THE FIRST COMPONENT 508

IN RESPONSE TO DETERMINING THAT A SECOND COMPONENT OF THE GROUP OF COMPONENTS IS REGISTERED TO RECEIVE AT LEAST THE PART OF THE INFORMATION ABOUT UPDATES THAT MATCH THE CRITERION, SEND THE ENTRY INFORMATION ABOUT THE ENTRY TO THE SECOND COMPONENT 510

PARSE ENTRY IN A LOG OF A LOG STRUCTURED STORAGE ENGINE 604

IN RESPONSE TO DETERMINING THAT A FIRST COMPONENT OF A GROUP OF COMPONENTS IS REGISTERED TO RECEIVE INFORMATION ABOUT LOG UPDATES, SEND, TO THE FIRST COMPONENT, ENTRY INFORMATION ABOUT THE ENTRY 606

IN RESPONSE TO DETERMINING THAT A SECOND COMPONENT OF THE GROUP OF COMPONENTS IS REGISTERED TO RECEIVE INFORMATION ABOUT LOG UPDATES, SEND, TO THE SECOND COMPONENT, THE ENTRY INFORMATION ABOUT THE ENTRY 608

JOURNAL PARSING FOR OBJECT EVENT GENERATION

BACKGROUND

A journaled file system can maintain a log of actions taken on the file system. When taking an action (e.g., creating a new file), the journaled file system can store a summary of this action in the log before taking the action. Some computer system processes can selectively perform various actions based on the contents of a journaled file system log. A journaled file system can sometimes be referred to as a write-ahead journaled file system, because journal entries are written before corresponding actions are taken on the file system.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can register a first client and a second client to respectively receive information about updates to a write-ahead log structured storage engine that comprises a log. The system can read an entry in the log, the entry being of an update type. The system can, in response to determining that the first client is registered to receive at least some of the information about updates that are of the update type, sending, to the first client, entry information about the entry. The system can, in response to determining that the second client is registered to receive information about updates that are of the update type, sending, to the second client, the entry information about the entry.

An example method can comprise registering, by a system comprising a processor, a group of components to receive update information about updates to a write-ahead log structured storage engine that comprises a log. The method can further comprise parsing, by the system, an entry in the log, the entry matching a criterion. The method can further comprise, in response to determining that a first component of the group of components is registered to receive at least part of the information about updates that match the criterion, sending, by the system, entry information about the entry to the first component. The method can further comprise, in response to determining that a second component of the group of components is registered to receive at least the part of the information about updates that match the criterion, sending, by the system, the entry information about the entry to the second component.

An example non-transitory computer-readable medium can comprise instructions that, in response to execution, cause a system comprising a processor to perform operations. These operations can comprise parsing an entry in a log of a write-ahead log structured storage engine. These operations can further comprise in response to determining that a first component of a group of components is registered to receive information about log updates, sending, to the first component, entry information about the entry. These operations can further comprise, in response to determining that a second component of the group of components is registered to receive information about journal updates, sending, to the second component, the entry information about the entry.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 5 illustrates another example process flow that can facilitate log parsing for object event generation, in accordance with an embodiment of this disclosure;

FIG. 6 illustrates another example process flow that can facilitate log parsing for object event generation, in accordance with an embodiment of this disclosure;

DETAILED DESCRIPTION

Overview

Figure 1:
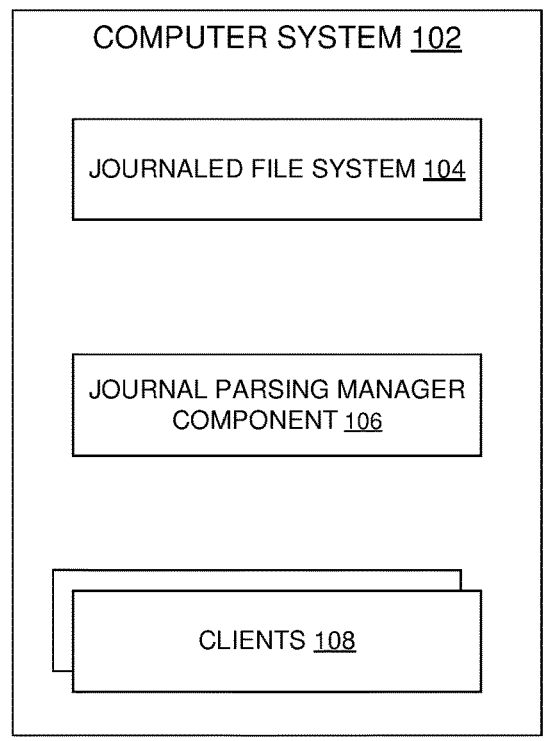
FIG. 1 illustrates an example system architecture that can facilitate journal parsing for object event generation, in accordance with an embodiment of this disclosure.

While the present examples generally describe a journaled file system, it can be appreciated that the present techniques can be applied to log structured storage engines (sometimes referred to as write-ahead log structured storage engines), which can include journaled file systems.

Some computer services can operate as background processes to observe object updates in a file system that implements a write-ahead log or a journal. Such services can perform functions such as reference counting for garbage collection, capacity-based metering, or reconstruction of internal object key-value search trees. In some prior techniques, each service can independently observe object updates by reading the updates from a journal stored on disk (such services can be referred to as "journal parsing clients").

This can lead to multiple processes consuming the same object updates from disk (e.g., each process can independently access a particular journal entry from disk and parse it). Multiple processes independently consuming the same object updates from disk can lead to increased use of system resources (such as disk input/output (I/O) resources, processing resources, and memory resources) proportionally to a number of clients that are consuming objects.

A solution to this problem of increased system resource usage can be to efficiently centralizing object journal parsing in a manner that permits a number of clients to scale up while holding resource usage for the parsing constant. This approach can make more system resources available for front end operations in a storage system.

Returning to prior techniques, in some examples, prior techniques for journal processing can involve M disconnected client services (that are disconnected because they do not operate in coordination) with Q independent processes for each partition. In these examples, each process individually reads the object table journal in the background, and transforms relevant journal entries into an action that is processed locally by the client service. One such service can read object journals to maintain a count of the number of objects that reference a given chunk segment. Another such service can read object journals to track storage capacity consumed by objects, and categorize the usage per bucket, per user, etc.

In contrast, in some examples, approaches according to the present techniques can provide improvements relative to these prior techniques. For example, disk I/O and related processor and memory consumption of reading journals can be reduced by a factor of 1/M*P, where M is a number of journal parsing clients, and P is a number of partitions that share each journal chunk. These freed resources (relative to prior techniques) can be devoted to user facing traffic.

Another improvement over prior techniques can relate to parsing unsealed journal chunks. In some examples, prior techniques cannot parse unsealed journal chucks. The present techniques can be used to parse unsealed journal chucks with the same 1/M*P as above to reduce a latency between $t_{JW}$ and $t_{JP}$, where $t_{JW}$ is a time at which journal entry j is written to a journal chunk, and $t_{JP}$ is a time at which journal entry j is parsed by each client. This time improvement can give customers and clients a near-real time view of their object storage situation.

The present techniques can be used to implement centralized journal parsing. According to these techniques, a component can read a journal from disk once, extract relevant information from the journal entries based on the requirements of a set of clients, and publish the information in the form of an event to a message bus or remote procedure call (RPC endpoint).

A journal parsing manager can be a process responsible for orchestrating centralized concurrent journal parsing. The manager can execute a scheduled process every fixed period to find unparsed journal regions on a storage system, aggregate them into a set of jobs, and execute each job to parse the respective journal regions for each client.

A journal parsing manager can maintain one or more journal parsing markers (JPMs). A particular JPM can mark a specific location in a journal. In the context of the present journal parsing techniques, a JPM can be used to save a last successfully parsed location in a partition's journal. In some system architectures, a JPM can identify a journal region major number, minor number, and offset of a location within a journal chunk.

In a centralized journal parsing model, a JPM can be persisted for each client of the journal parser on each partition. Therefore, a total number of JPMs used can be partitions*clients.

Given a single JPM, a journal parsing manager can list existing journal regions ahead of that marker. These listed regions can be journal reasons that have yet to be parsed for a client that corresponds to the JPM.

Given a list of journal regions to parse, a journal parsing manager can load each of the journal regions from disk and parse each journal entry. The journal parsing manager can allow each journal parsing client to transform each journal entry into an event if the entry matches some criteria defined by the client.

In some system architectures, a location of a journal chunk on disk can be stored in a chunk table that stores each chunk's metadata. Each chunk's metadata can include a start offset, an end offset, and a reference to the disk segments comprising the chunk's data. To load a journal chunk from disk, the chunk's metadata can be fetched, and the disk segments can be loaded based on the known start and end offset of the chunk.

Where a chunk is still being actively written to, it can be considered unsealed, and its end offset can be considered unknown. When the chunk's data reaches a fixed limit, a process can seal the chunk and signal the journal writers to allocate a new chunk for their incoming journal data. Similarly, while a journal chunk is unsealed, each partition sharing the journal chunk can have a special unsealed journal region indicating that the latest journal regions for the table are being actively written to the specified chunk, but the locations in the chunk are unknown. In order to load unsealed journal data from disk, some valid end offset can be determined to avoid loading data from outside the bounds of the chunk. To handle this scenario, the journal chunk manager can query the latest offset to which each journal writer has written.

In some examples, in an unsealed journal chunk, there is no metadata stored until the chunk is sealed about which regions in the chunk belong to which DT partition. The consequence is that in order to load the journal content for a specific DT partition in an unsealed journal chunk, the loader must load the content of the entire chunk from disk and filter out the entries not belonging to the requested DT partition.

After journal region content is read from disk, the content's entries can be parsed into a known format and passed to each client to transform into an event at its discretion.

After a journal region is fully parsed, a journal parsing manager can update a corresponding JPM to be positioned at an end of the corresponding region. Where a batch of regions is parsed at once, the marker's position at the end can be set to an end of the greatest region successfully parsed.

In some examples, prior techniques can be equivalent to N independent journal parsing managers carrying out journal parsing. In the present techniques, resource consumption can be reduced relative to those approaches by facilitating one journal parsing manager to handle the N JPMs within the same process.

A single journal parsing manager can begin by loading the N JPMs into the system. There can be a separate JPM for each client's current location in each partition's journal.

The journal parsing manager can list journal regions existing from the marker forward for each marker independently. In some examples, these listing operations can be performed in parallel.

Where each client has reached a same marked location in each partition's journal, grouping list regions results by each client can produce M identical lists of regions, where M is the number of clients. Instead of loading the same journal region from disk and parsing its entries M times, the journal parsing manager can aggregate the N lists of journal regions to parse into N/M jobs.

Moreover, each journal chunk can be shared by P>=1 partitions. Given this, a journal parsing manager can further aggregate the N/M parsing jobs into N/(M*P) jobs by grouping each job's list of regions by an identifier of the journal chuck where the region exists. In some examples, a journal parser aimed at near real time event generation can generally be parsing content from an unsealed journal chunk.

A function of each job can be to read its respective journal chunk from disk from a minimum start offset to a maximum end offset of its list of journal regions. Where the jobs combine the regions from partitions sharing a particular journal chunk, the chunk's content can be loaded and parsed at a single time. Each parsed entry can be provided to each of the M clients once it is parsed so that a respective client can have an opportunity to transform the entry into an event if the client so chooses. Once the journal regions within a job have been parsed and interested clients have generated their respective events, the job can update its respective M*P journal parsing markers to a maximum end offset processed by the job.

Implementation of the present techniques can provide for reduced system resource consumption (e.g., disk I/O, processor usage, and memory usage) by a factor of M*P, where M is a number of clients interested in journal parsing, and P is a number of partitions that share journal chunks. Relative to existing techniques, this approach can permit M and P to increase while journal processing resource consumption remains constant, or scales at a rate much lower than a rate at which M and/or P scale.

Example Architectures

FIG. 1 illustrates an example system architecture 100 that can facilitate journal parsing for object event generation, in accordance with an embodiment of this disclosure. System architecture 100 comprises computer system 102, which in turn comprises journaled file system 104, journal parsing manager component 106, and clients 108. Journaled file system 104 can comprise a computer file system that stores information about changes to the file system that are not yet committed in a journal, or log. Journal parsing manager component 106 can parse the entries of the journal of journaled file system.

Clients 108 can comprise system services that monitor journal entries of journaled file system 104, and selectively perform functions based on the contents of those entries (e.g., perform reference counting for garbage collection). Clients 108 can register to receive information about journal entries from journal parsing manager component 106. In some examples, a client of clients 108 can specify a certain type or category of information to receive information about. Journal parsing manager component 106 can parse the journal of journaled file system 104 on behalf of registered clients of clients 108, and send information about the parsed journal entries to clients 108.

Figure 2:
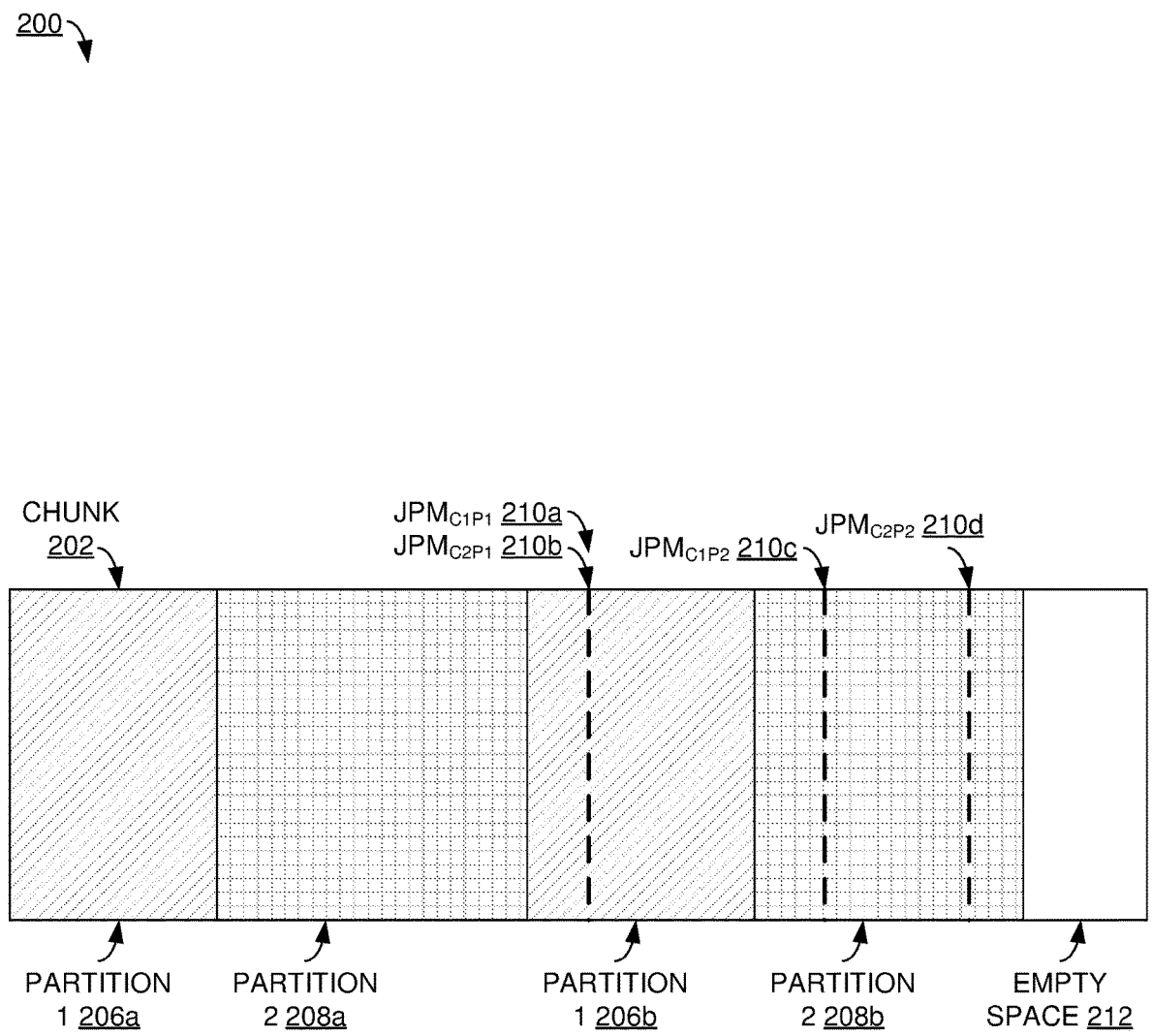
FIG. 2 illustrates an example system architecture of multiple markers in multiple partitions for multiple clients that can facilitate journal parsing for object event generation, in accordance with an embodiment of this disclosure.
Figure 3:
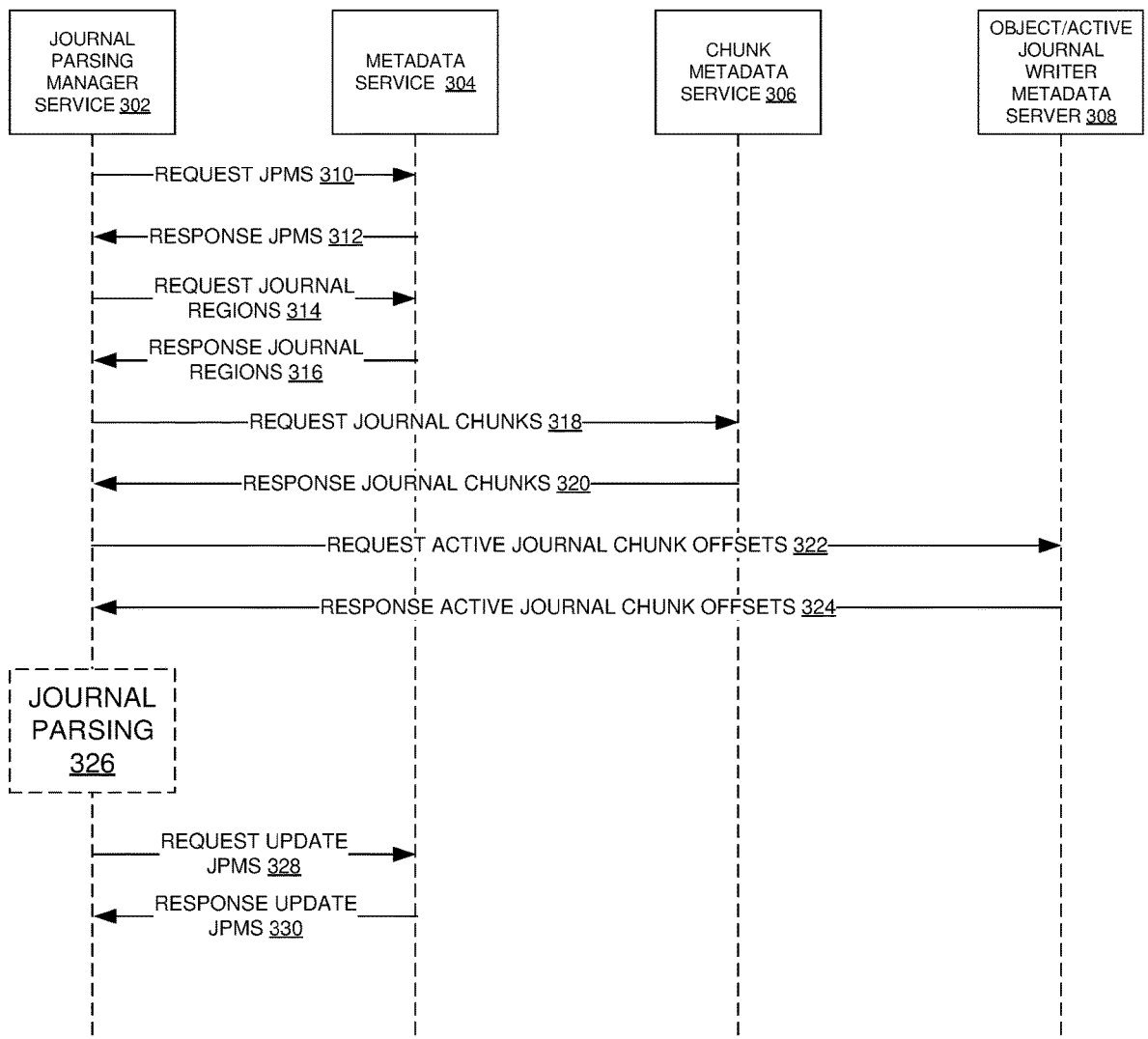
FIG. 3 illustrates an example signal flow that can facilitate journal parsing for object event generation, in accordance with an embodiment of this disclosure.

In the course of implementing journal parsing for object event generation, journal parsing manager component 106 can implement part(s) of system architecture 200 of FIG. 2, and/or signal flow 300 of FIG. 3.

Figure 4:
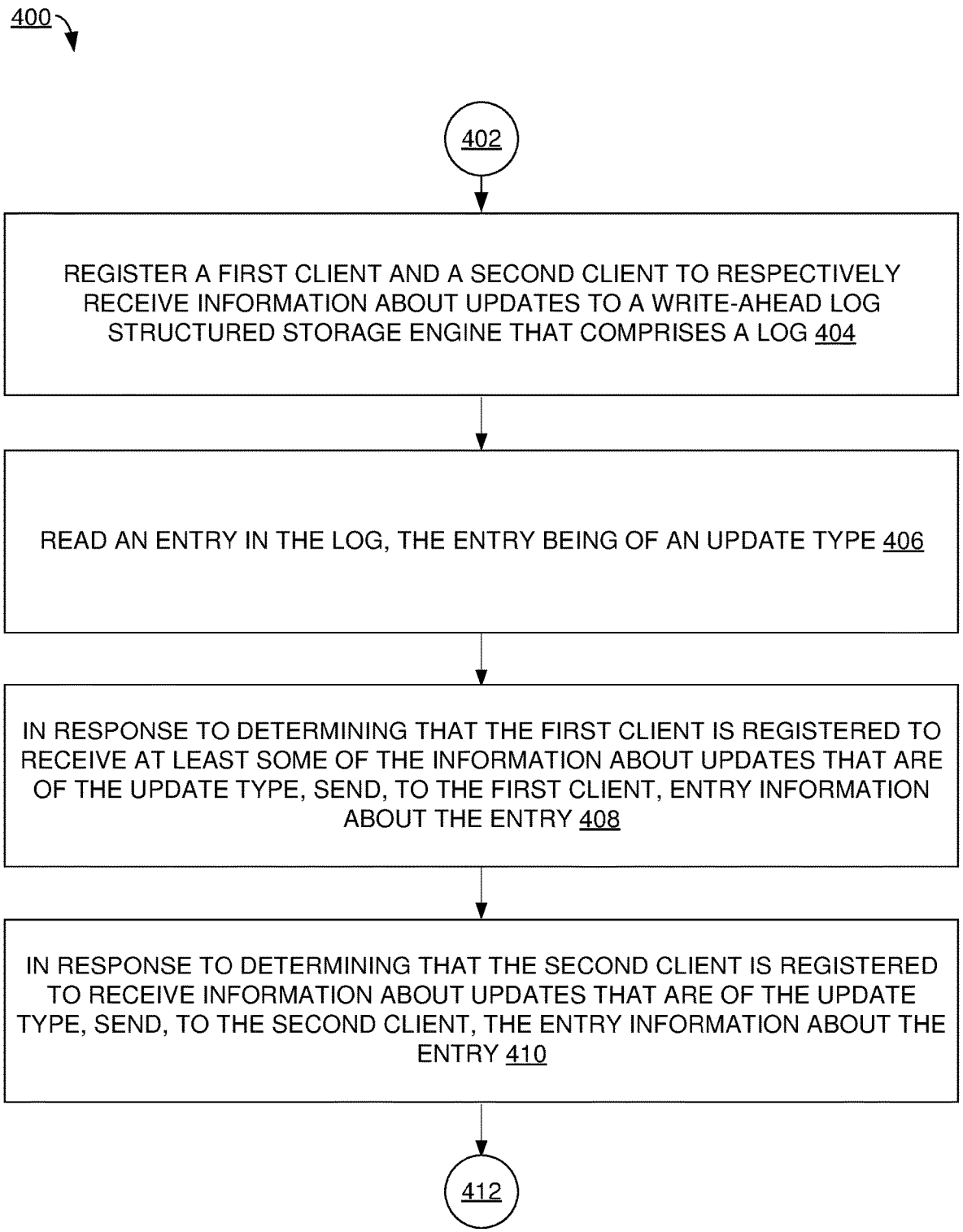
FIG. 4 illustrates an example process flow that can facilitate log parsing for object event generation, in accordance with an embodiment of this disclosure.
Figure 7:
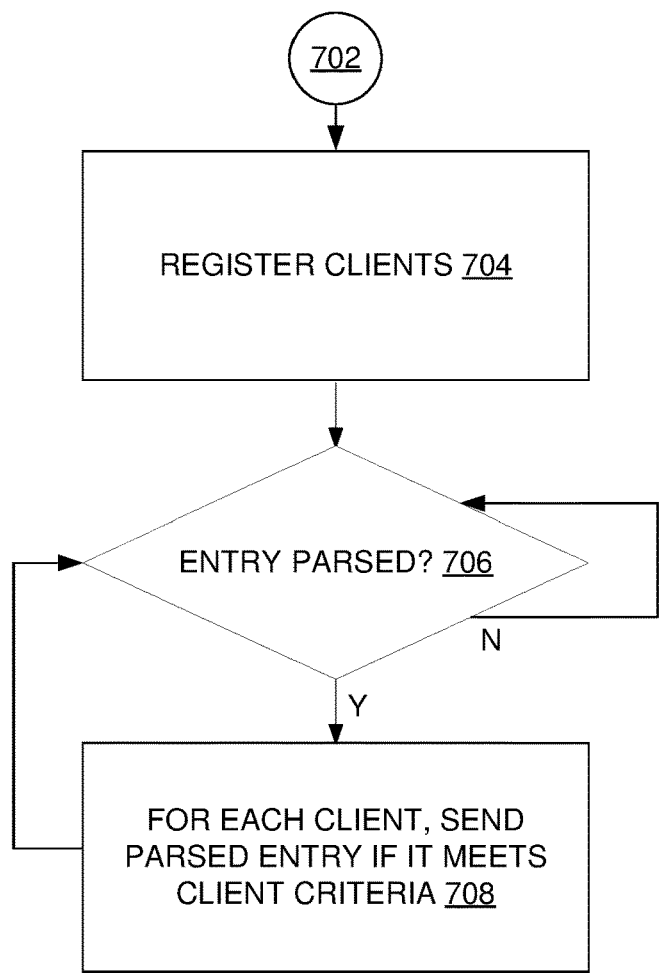
FIG. 7 illustrates an example process flow for selectively sending events to registered clients that can facilitate log parsing for object event generation, in accordance with an embodiment of this disclosure.
Figure 8:
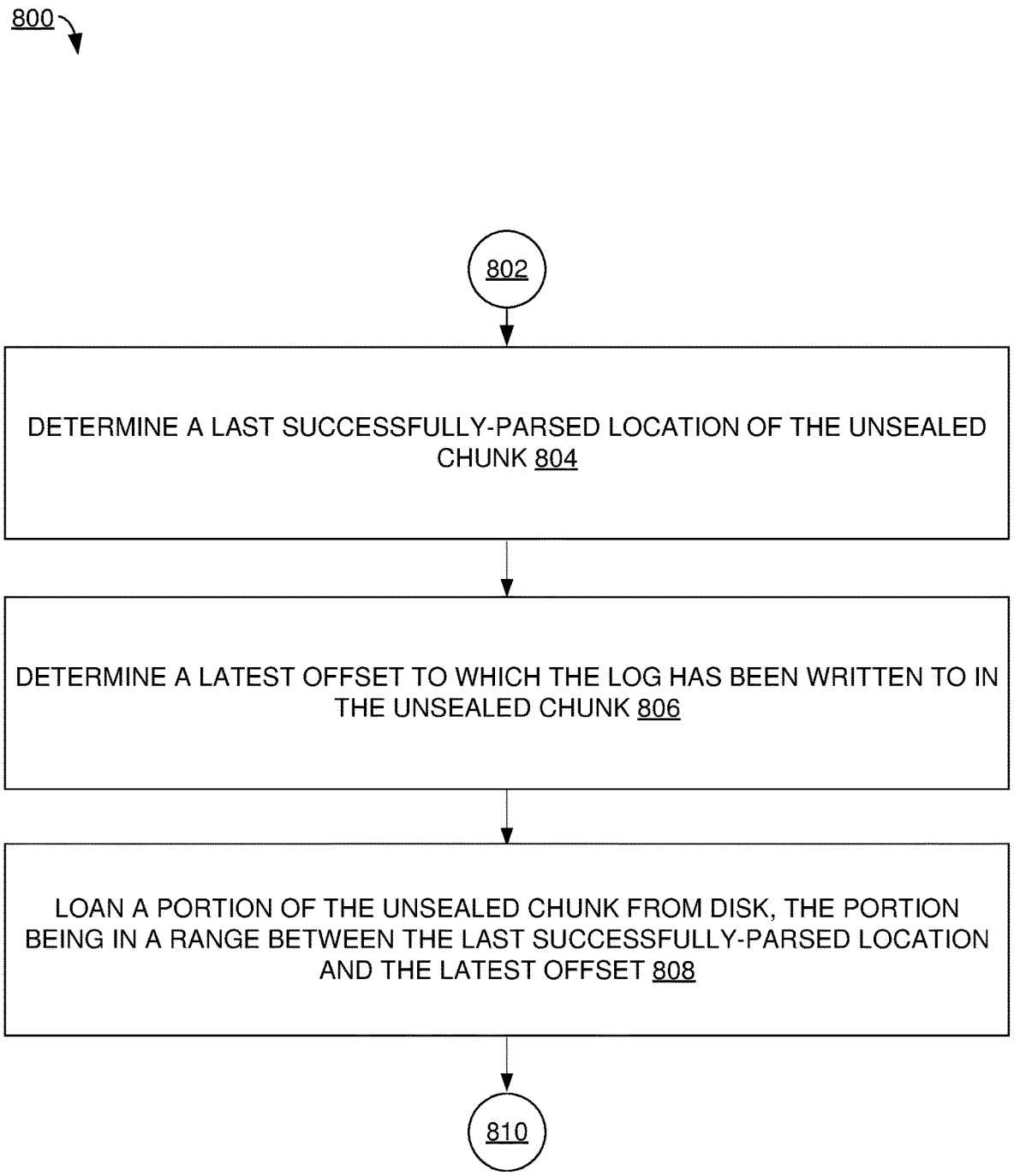
FIG. 8 illustrates an example process flow for reading updates from unsealed chunks that can facilitate log parsing for object event generation, in accordance with an embodiment of this disclosure.
Figure 9:
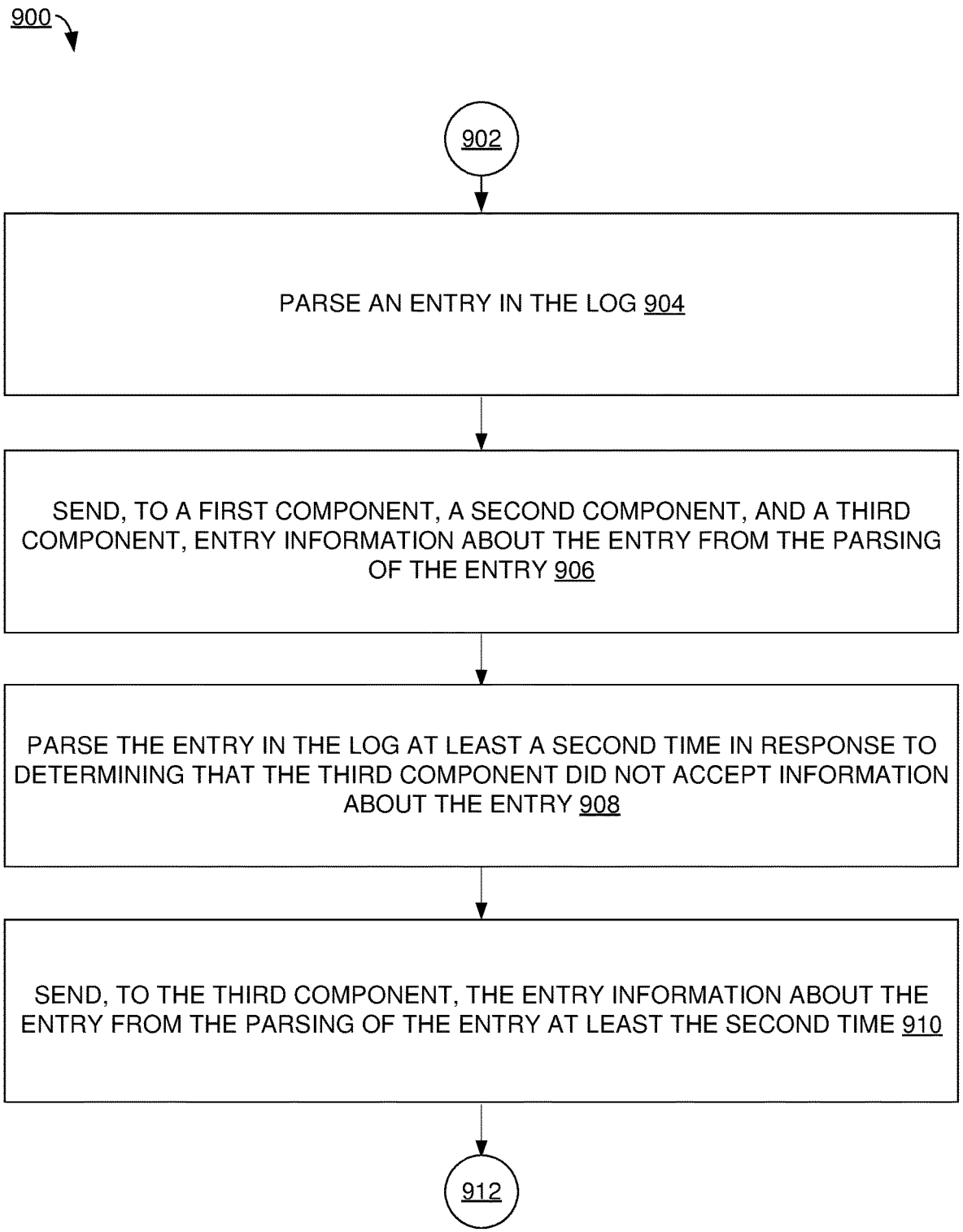
FIG. 9 illustrates an example process flow for parsing a journal entry multiple times that can facilitate log parsing for object event generation, in accordance with an embodiment of this disclosure.

Additionally, in the course of implementing journal parsing for object event generation, journal parsing manager component 106 can implement part(s) of process flow 400 of FIG. 4, process flow 500 of FIG. 5, process flow 600 of FIG. 6, process flow 700 of FIG. 7, process flow 800 of FIG. 8, and/or process flow 900 of FIG. 9.

FIG. 2 illustrates an example system architecture 200 of multiple markers in multiple partitions for multiple clients that can facilitate journal parsing for object event generation, in accordance with an embodiment of this disclosure. As depicted, system architecture 200 comprises chunk 202. A chunk can comprise a logical amount of computer memory or storage, such as 128 megabytes (MB).

In some file systems, chunks such as chunk 202 can be allocated, and data can be written to chunks, including journal information. It can be appreciated that the present techniques can be applied to types of file systems that are implemented in other ways, without chunks. In the example of system architecture 200, one chunk is illustrated to focus on specific parts of the present techniques. In can be appreciated that there can be examples that implement multiple chunks, and have JPMs spread across multiple chunks.

Chunk 202 can comprise multiple partitions, and a partition can generally comprise a separate region of data storage. As depicted, chunk 202 stores data for two partitions, one partition comprising partition 1 206a and partition 1 206b, and another partition comprising partition 2 208a and partition 2 208b. Data for a given partition can be spread throughout a chunk, as depicted, rather than occupying a contiguous portion of a chunk.

Chunk 202 also comprises empty space 212, which is a portion of chunk 202 for which data has not yet been written. Using the example where a chunk has a size of 128 MB, where 100 MB has been written to a particular chunk, that chunk will have 28 MB of empty space.

Journal parsing manager component 106 of FIG. 1 can maintain JPMs for chunk 202 as part of performing journal parsing for object event generation. In some examples, journal parsing manager component 106 can maintain a separate JPM for each client in each partition. That is, journal parsing manager component 106 can maintain a total of M*P JPMs, where M is a number of journal parsing clients, and P is a number of partitions that share each journal chunk In the example of system architecture 200, there are two journal parsing clients (M=2), and two partitions (P=2), so there are a total of four JPMs (M*P=4).

One JPM is for a first client in partition 1—$JPM_{C1P1}$ 210a. One JPM is for a second client in partition 1—$JPM_{C2P1}$ 210b. Here, $JPM_{C1P1}$ 210a and $JPM_{C2P1}$ 210b are at a same location within chunk 202a because both clients have accepted relevant events parsed by journal parsing manager component 106 for partition 1.

Returning to JPMs, for partition 2, a JPM is for the first client in partition 2—$JPM_{C1P2}$ 210c. Another JPM is for the second client in partition 2—$JPM_{C2P2}$ 210d. In contrast to partition 1, here the two partitions are at two different locations—$JPM_{C1P2}$ 210c is behind $JPM_{C2P2}$ 210d, so $JPM_{C2P2}$ 210d has accepted more parsed events than $JPM_{C1P2}$ 210c. A reason for this situation could be that the first client crashed and was unable to accept certain parsed events as they were created, while the second client continued to operate and accept parsed events.

Example Signal Flow

FIG. 3 illustrates an example signal flow 300 that can facilitate journal parsing for object event generation, in accordance with an embodiment of this disclosure. In some examples, part(s) of signal flow 300 can be implemented by journal parsing manager component 106 of FIG. 1, or computing environment 1000 of FIG. 10.

Signal flow 300 comprises journal parsing manager service 302, partition metadata service 304, chunk metadata service 306, and object/active journal writer metadata server 308. Each of journal parsing manager service 302, partition metadata service 304, chunk metadata service chunk metadata service 306, and object/active journal writer metadata server 308 can comprise a computer component that operates on computer system 102 of FIG. 1.

At signal 310, journal parsing manager service 302 requests JPMs from partition metadata service 304. At signal 312, partition metadata service 304 sends response JPMs to journal parsing manager service 302.

At signal 314, journal parsing manager service 302 requests journal regions from partition metadata service 304. At signal 316, partition metadata service 304 sends response journal regions to journal parsing manager service 302.

At signal 318, journal parsing manager service 302 requests journal chunks from chunk metadata service 306. At signal 320, chunk metadata service 306 sends response journal chunks to journal parsing manager service 302.

At signal 322, journal parsing manager service 302 requests active journal chunk offsets from object/active journal writer metadata server 308. At signal 324, object/active journal writer metadata server 308 sends response active journal chunk offsets to journal parsing manager service 302.

Using the information received in signal 312, signal 316, signal 320, and signal 324, journal parsing manager service 302 performs journal parsing 326.

After performing journal parsing 326, journal parsing manager service 302 sends signal 328 to partition metadata service 304 to request update JPMs. At signal 330, partition metadata service 304 sends response update JPMs to journal parsing manager service 302.

Example Process Flows

FIG. 4 illustrates an example process flow 400 that can facilitate journal parsing for object event generation, in accordance with an embodiment of this disclosure. In some examples, one or more embodiments of process flow 400 can be implemented by journal parsing manager component 106 of FIG. 1, or computing environment 1000 of FIG. 10.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 500 of FIG. 5, process flow 600 of FIG. 6, process flow 700 of FIG. 7, process flow 800 of FIG. 8, and/or process flow 900 of FIG. 9.

Process flow 400 begins with 402, and moves to operation 404. Operation 404 depicts registering a first client and a second client to respectively receive information about updates to a write-ahead log structured storage engine that comprises a log. For example, clients of clients 108 of FIG. 1 can register with journal parsing manager component 106 to receive updates about journal entries as they are parsed by journal parsing manager component 106.

In some examples, the registering the first client to receive the information about updates comprises registering the first client to receive the at least some of the information about updates of the update type.

In some examples, the update type is a first update type, and operation 404 comprises registering the first client to receive the at least some of the information about a subset of possible update types. That is, registering to receive information about update types can entail registering to receive information about a subset of all journal entries.

After operation 404, process flow 400 moves to operation 406.

Operation 406 depicts reading an entry in the log, the entry being of an update type. This can be performed by journal parsing manager component 106 in reading a journal entry of journaled file system 104. A journal entry can be of a particular type.

In some examples, operation 406 comprises maintaining a first marker that identifies a first location that was last successfully-parsed for the first client in the log, and maintaining a second marker that identifies a second location that was last successfully-parsed for the second client in the log. That is, a marker can be maintained for each client.

In some examples, the first marker identifies a region major number, a region minor number, and an offset of the first marker within a chunk that stores information about the log. That is, in certain system architectures, a marker can store this information to identify where in a journal a safe check point is located for a given client and partition.

In some examples, operation 406 comprises maintaining a first marker that identifies a first location that was last successfully-parsed for the first client in a first partition of the log, and maintaining a second marker that identifies a second location that was last successfully-parsed for the first client in a second partition of the log. That is, each client can have a corresponding marker for each partition of the file system.

After operation 406, process flow 400 moves to operation 408.

Operation 408 depicts, in response to determining that the first client is registered to receive at least some of the information about updates that are of the update type, sending, to the first client, entry information about the entry. That is, where journal parsing manager component 106 of FIG. 1 parses a journal entry and determines its type, and determines that the first client is registered to receive updates of this type, journal parsing manager component 106 can send this information to the first client.

After operation 408, process flow 400 moves to operation 410.

Operation 410 depicts, in response to determining that the second client is registered to receive information about updates that are of the update type, sending, to the second client, the entry information about the entry. Similar to operation 408, that is, where journal parsing manager component 106 of FIG. 1 parses a journal entry and determines its type, and determines that the second client is registered to receive updates of this type, journal parsing manager component 106 can send this information to the second client. In this manner, a journal entry can be read and parsed once, rather than multiple times for multiple clients that are consuming journal entries, and this approach can save on computing resources.

In some examples, operation 410 comprises, registering a third client to receive the information about updates to the log structured storage engine, and in response to determining that the third client is not registered to receive the at least some of the information about updates that are of the update type, determining to refrain from the sending of the entry information to the second client. That is, where a client is not registered to receive updates of a particular type, in some examples, journal parsing manager component 106 of FIG. 1 will refrain from sending the client updates of that particular type, though journal parsing manager component 106 sends other clients those updates (because those other clients are registered for that update type).

After operation 410, process flow 400 moves to 412, where process flow 400 ends.

FIG. 5 illustrates another example process flow 500 that can facilitate log parsing for object event generation, in accordance with an embodiment of this disclosure. In some examples, one or more embodiments of process flow 500 can be implemented by journal parsing manager component 106 of FIG. 1, or computing environment 1000 of FIG. 10.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 400 of FIG. 4, process flow 600 of FIG. 6, process flow 700 of FIG. 7, process flow 800 of FIG. 8, and/or process flow 900 of FIG. 9.

Process flow 500 begins with 502, and moves to operation 504. Operation 504 depicts registering a group of components to receive update information about updates to a log structured storage engine that comprises a journal. In some examples, operation 504 can be implemented in a similar manner as operation 404 of FIG. 4.

After operation 504, process flow 500 moves to operation 506.

Operation 506 depicts parsing an entry in the log, the entry matching a criterion. In some examples, operation 506 can be implemented in a similar manner as operation 406 of FIG. 4.

After operation 506, process flow 500 moves to operation 508.

Operation 508 depicts, in response to determining that a first component of the group of components is registered to receive at least part of the information about updates that match the criterion, sending entry information about the entry to the first component. In some examples, operation 508 can be implemented in a similar manner as operation 408 of FIG. 4.

In some examples, the entry in the log is stored in an unsealed chunk, and operation 506 comprises determining a last successfully-parsed location of the unsealed chunk, determining a latest offset to which the log has been written to in the unsealed chunk, and loading a portion of the unsealed chunk from disk, the portion being in a range between the last successfully-parsed location and the latest offset. In some examples, this can be performed in a similar manner as process flow 800 of FIG. 8.

In some examples, entries in the log in a first partition of a group of partitions are analyzed, and after the loading of the portion of the unsealed chunk, and operation 508 comprises filtering out entries belonging to partitions of the group of partitions other than the first partition. That is, information about a particular partition can be retrieved from an unsealed chunk.

In some examples, operation 508 comprises parsing the entry in the log at least a second time in response to determining that a third component of the group of components did not accept information about the entry, and sending, to the third component, the entry information about the entry from the parsing of the entry at least the second time. That is, a client can fall behind on updates, so a particular journal entry can be parsed multiple times so that the laggard client can receive an update on an entry. In some examples, this can be performed in a similar manner as process flow 900 of FIG. 9.

In some examples, the parsing is performed by a central component of the system on behalf of the first component and the second component, where the first component is not configured to parse the log directly. That is, one journal processing manager can read journal entries, rather than each of multiple clients separately reading journal entries.

In some examples, operation 508 comprises loading a data chunk that comprises the entry to produce a loaded data chunk, the loaded data chunk storing log information for a group of partitions, and parsing the log information for the group of partitions from the loaded data chunk. That is, a chunk can be loaded once to parse all of its updates for multiple partitions.

In some examples, operation 508 comprises, in response to parsing a batch of entries of the log in parallel, the batch of entries comprising the entry, updating an identifier of a last successfully-parsed location as a most recent entry of the batch of entries. That is, when a region is batched process, a marker's position can be set to the end of the greatest region successfully parsed.

After operation 508, process flow 500 moves to operation 510.

Operation 510 depicts in response to determining that a second component of the group of components is registered to receive at least the part of the information about updates that match the criterion, sending the entry information about the entry to the second component. In some examples, operation 510 can be implemented in a similar manner as operation 410 of FIG. 4.

After operation 510, process flow 500 moves to 512, where process flow 500 ends.

FIG. 6 illustrates another example process flow 600 that can facilitate log parsing for object event generation, in accordance with an embodiment of this disclosure. In some examples, one or more embodiments of process flow 600 can be implemented by journal parsing manager component 106 of FIG. 1, or computing environment 1000 of FIG. 10.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 400 of FIG. 4, process flow 500 of FIG. 5, process flow 700 of FIG. 7, process flow 800 of FIG. 8, and/or process flow 900 of FIG. 9.

Process flow 600 begins with 602, and moves to operation 604. Operation 604 depicts parsing an entry in a log of a log structured storage engine. In some examples, operation 604 can be implemented in a similar manner as operation 406 of FIG. 4.

In some examples, operation 604 comprises iteratively parsing the log for new entries according to a predetermined time period. That is, a scheduled process can be performed on a fixed period to find unparsed journal regions on a system.

After operation 604, process flow 600 moves to operation 606.

Operation 606 depicts, in response to determining that a first component of a group of components is registered to receive information about log updates, sending, to the first component, entry information about the entry. In some examples, operation 606 can be implemented in a similar manner as operation 408 of FIG. 4.

In some examples, the first component performs, based on the information about the entry, reference counting for garbage collection, capacity-based metering, or reconstruction of internal object key-value search trees. These are example operations that a client registered to receive journal parsing updates can perform.

In some examples, operation 606 comprises sending the entry information to the first component, the first component transforming the entry information into an event. That is, the journal parsing manager can send the parsed update to the client, and the client can transform the parsed update into an event.

In some examples, operation 606 comprises sending the entry information in an event to a message bus. In some examples, the journal parsing manager can send the client an event corresponding to the parsed journal entry via a message bus.

In some examples, operation 606 comprises sending the entry information in an event to a remote procedure call endpoint. In some examples, the journal parsing manager can send the client an event corresponding to the parsed journal entry via a RPC.

After operation 606, process flow 600 moves to operation 608.

Operation 608 depicts, in response to determining that a second component of the group of components is registered to receive information about log updates, sending, to the second component, the entry information about the entry. In some examples, operation 608 can be implemented in a similar manner as operation 410 of FIG. 4.

After operation 608, process flow 600 moves to 610, where process flow 600 ends.

FIG. 7 illustrates an example process flow 700 for selectively sending events to registered clients that can facilitate log parsing for object event generation, in accordance with an embodiment of this disclosure. In some examples, one or more embodiments of process flow 700 can be implemented by journal parsing manager component 106 of FIG. 1, or computing environment 1000 of FIG. 10.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 400 of FIG. 4, process flow 500 of FIG. 5, process flow 600 of FIG. 6, process flow 800 of FIG. 8, and/or process flow 900 of FIG. 9.

Process flow 700 begins with 702, and moves to operation 704. Operation 704 comprises registering clients. In some examples, operation 704 can be implemented in a similar manner as operation 404 of FIG. 4.

After operation 704, process flow 700 moves to operation 706.

Operation 706 is reached from operation 704, from operation 706 where it is determined that an entry has not been parsed, or from operation 708. Operation 706 depicts determining whether an entry has been parsed. In some examples, journal parsing manager component 106 of FIG. 1 can periodically parse journal entries in journaled file system 104. Where journal parsing manager component 106 of FIG. 1 does parse an entry, then it can be determined in operation 706 that an entry has been parsed.

Where it is determined in operation 706 that an entry has been parsed, process flow 700 moves to operation 708. Instead, where it is determined in operation 706 that an entry has not been parsed, process flow 700 stays at operation 706. In this manner, process flow 700 can monitor for parsed entries and handle them as they are parsed.

Operation 708 is reached from operation 706 where it is determined that an entry has been parsed. Operation 708 depicts, for each client, sending the entry if it meets client criteria. A client can register with journal parsing manager component 106 of FIG. 1 to receive journal parsing updates, and specifically for certain types of updates. In operation 708, journal parsing manager component 106 of FIG. 1 can determine whether the present entry meets the criteria specified by each client, and where this is true, send the entry to the respective client.

After operation 708, process flow 700 returns to operation 706. In this manner, loops of operation 706-708 can be performed to send parsed entries to appropriate clients as the entries are parsed.

FIG. 8 illustrates an example process flow 800 for reading updates from unsealed chunks that can facilitate log parsing for object event generation, in accordance with an embodiment of this disclosure. In some examples, one or more embodiments of process flow 800 can be implemented by journal parsing manager component 106 of FIG. 1, or computing environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 400 of FIG. 4, process flow 500 of FIG. 5, process flow 600 of FIG. 6, process flow 700 of FIG. 7, and/or process flow 900 of FIG. 9.

Process flow 800 begins with 802, and moves to operation 804. Operation 804 depicts determining a last successfully-parsed location of the unsealed chunk. In some examples, this last successfully-parsed location of the unsealed chunk can be maintained with a JPM.

After operation 804, process flow 800 moves to operation 806.

Operation 806 depicts determining a latest offset to which the log has been written to in the unsealed chunk. In some examples, journal parsing manager component 106 of FIG. 1 can query for this information in a similar manner as in signal flow 400 of FIG. 4.

After operation 806, process flow 800 moves to operation 808.

Operation 808 depicts loading a portion of the unsealed chunk from disk, the portion being in a range between the last successfully-parsed location and the latest offset. In some examples, journal parsing manager component 106 of FIG. 1 can issue a command to journaled file system 104 to access a range of data stored in journaled file system 104. This range of data can be the data that is bounded by between the last successfully-parsed location and the latest offset. In this manner, journal parsing manager component 106 can load information from an unsealed chunk without loading data beyond the boundaries of the chunk.

After operation 808, process flow 800 moves to 810, where process flow 800 ends.

FIG. 9 illustrates an example process flow 900 for parsing a log entry multiple times that can facilitate log parsing for object event generation, in accordance with an embodiment of this disclosure. In some examples, one or more embodiments of process flow 900 can be implemented by journal parsing manager component 106 of FIG. 1, or computing environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 400 of FIG. 4, process flow 500 of FIG. 5, process flow 600 of FIG. 6, process flow 700 of FIG. 7, and/or process flow 800 of FIG. 8.

Process flow 900 begins with 902, and moves to operation 904. Operation 904 depicts parsing an entry in the log. In some examples, operation 904 can be implemented in a similar manner as operation 406 of FIG. 4.

After operation 904, process flow 900 moves to operation 906.

Operation 906 depicts sending, to a first component, a second component, and a third component, entry information about the entry from the parsing of the entry. In some examples, operation 904 can be implemented in a similar manner as operation 408 of FIG. 4.

After operation 906, process flow 900 moves to operation 908.

Operation 908 depicts parsing the entry in the log at least a second time in response to determining that the third component did not accept information about the entry. In some examples, journal parsing manager component 106 of FIG. 1 can send information about entries to components, and the components can send acknowledgement messages back to journal parsing manager component to confirm that they received the information. Where journal parsing manager component 106 does not receive an acknowledgment message from the third component within a predetermined amount of time, journal parsing manager component 106 can determine that the third component did not accept information about the entry.

In some examples, journal parsing manager component 106 updates JPMs after receiving a corresponding acknowledgment message. Having not received an acknowledgment message from the third component, it can be that journal parsing manager component 106 has not updated the third component's, and so can parse the next entry indicated by the third component's JPM, which is the same journal entry that journal parsing manager component 106 already parsed.

In some examples, journal parsing manager component 106 stores a limited amount of parsed journal entries (or does not store parsed journal entries). So, where enough time has passed and journal parsing manager component 106 has parsed enough new journal entries, journal parsing manager component 106 might not still have the parsed journal entry stored, so parses it a second time.

After operation 908, process flow 900 moves to operation 910.

Operation 910 depicts sending, to the third component, the entry information about the entry from the parsing of the entry at least the second time. In some examples, operation 910 can be implemented in a similar manner as operation 904.

After operation 910, process flow 900 moves to 912, where process flow 900 ends.

Example Operating Environment

Figure 10:
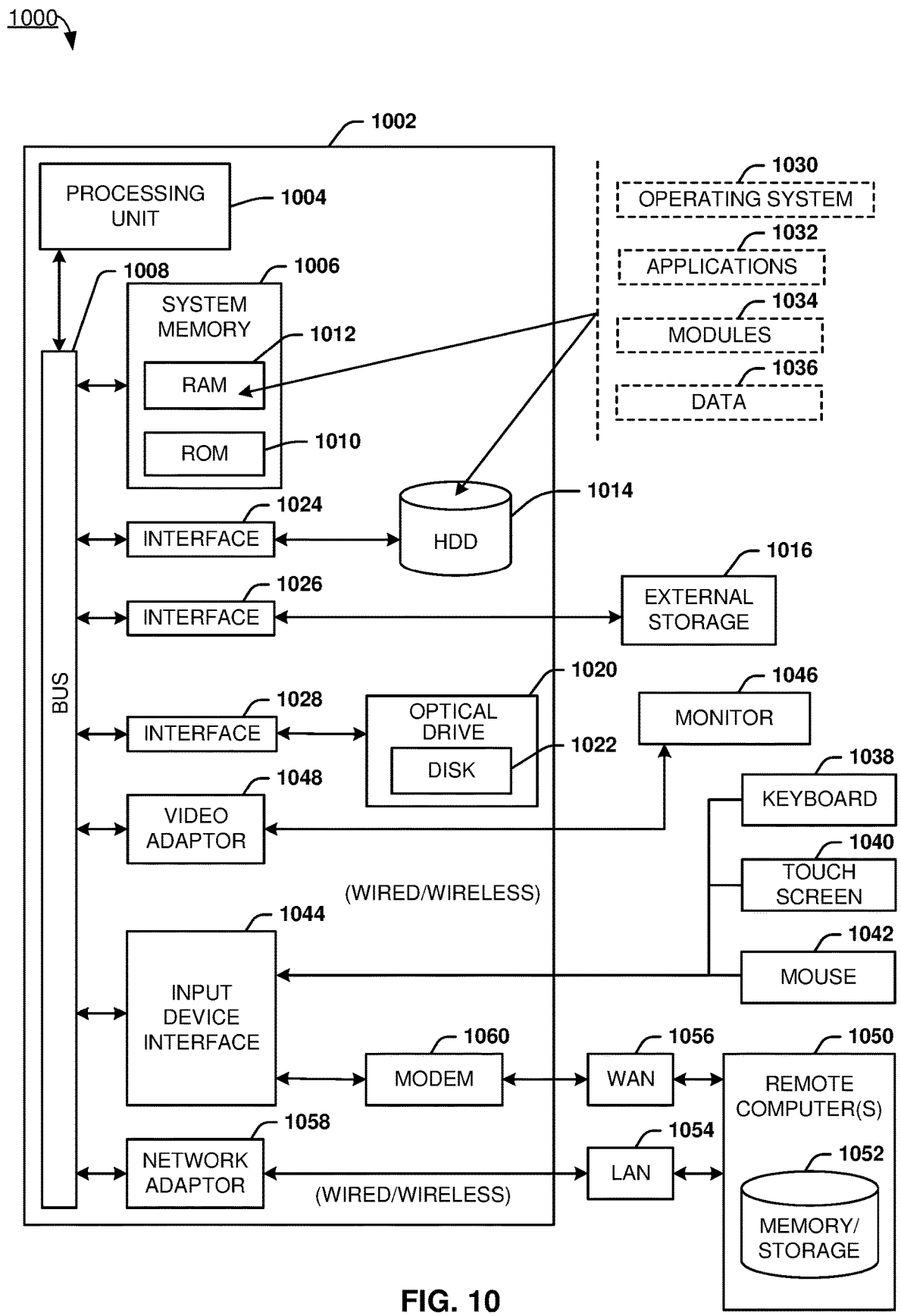
FIG. 10 illustrates an example block diagram of a computer operable to execute an embodiment of this disclosure.

In order to provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of client computer 102 of FIG. 1.

In some examples, computing environment 1000 can implement one or more embodiments of the process flows of FIGS. 4-10 to facilitate journal parsing for object event generation.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile storage such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   registering a first client and a second client to respectively receive information about updates to a write-ahead log structured storage engine that comprises a log;
   reading an entry in the log, the entry being of an update type, to enable centralized journal parsing by scaling up a number of clients while holding resource usage constant;
   in response to determining that the first client is registered to receive at least some of the information about updates that are of the update type, sending, to the first client, entry information about the entry;
   in response to determining that the second client is registered to receive the information about updates that are of the update type, sending, to the second client, the entry information about the entry; and
   maintaining a first marker that identifies a first location that was last successfully-parsed for the first client in the log, wherein the first marker identifies a region major number within a chunk that stores information about the log.

2. The system of claim 1, wherein the registering the first client to receive the information about updates comprises registering the first client to receive the at least some of the information about updates of the update type.

3. The system of claim 2, wherein the update type is a first update type, and wherein the registering the first client to receive the at least some of the information about updates comprises:
   registering the first client to receive the at least some of the information about a subset of possible update types.

4. The system of claim 1, wherein the operations further comprise:
   registering a third client to receive the information about updates to the write-ahead log structured storage engine; and
   in response to determining that the third client is not registered to receive the at least some of the information about updates that are of the update type, determining to refrain from the sending of the entry information to the second client.

5. The system of claim 1, wherein the operations further comprise:
   maintaining a second marker that identifies a second location that was last successfully-parsed for the second client in the log.

6. The system of claim 1, wherein the first marker further identifies a region minor number and an offset of the first marker within the chunk that stores information about the log.

7. The system of claim 1, wherein the operations further comprise:
   maintaining the first marker that identifies the first location that was last successfully-parsed for the first client in a first partition of the log; and
   maintaining a second marker that identifies a second location that was last successfully-parsed for the first client in a second partition of the log.

8. A method, comprising:
   registering, by a system comprising a processor, a first client and a second client to respectively receive information about updates to a write-ahead log structured storage engine that comprises a log;

reading, by the system, an entry in the log, the entry being of an update type, to enable centralized journal parsing by scaling up a number of clients while maintaining an amount of resource usage;

sending, by the system, entry information about the entry, to the first client, in response to determining that the first client is registered to receive at least some of the information about updates that are of the update type;

sending, by the system, the entry information about the entry, to the second client, in response to determining that the second client is registered to receive the information about updates that are of the update type; and maintaining, by the system, a first marker that identifies a first location that was last successfully-parsed for the first client in a first partition of the log.

9. The method of claim 8, wherein the registering the first client to receive the information about updates comprises registering the first client to receive the at least some of the information about updates of the update type.

10. The method of claim 9, wherein the update type is a first update type, and wherein the registering the first client to receive the at least some of the information about updates comprises:

registering, by the system, the first client to receive the at least some of the information about a subset of possible update types.

11. The method of claim 8, further comprising:

registering, by the system, a third client to receive the information about updates to the write-ahead log structured storage engine; and determining, by the system, to refrain from the sending of the entry information to the second client, in response to determining that the third client is not registered to receive the at least some of the information about updates that are of the update type.

12. The method of claim 8, further comprising:

maintaining, by the system, the first marker that identifies the first location that was last successfully-parsed for the first client in the log; and maintaining, by the system, a second marker that identifies a second location that was last successfully-parsed for the second client in the log.

13. The method of claim 8, wherein the first marker identifies a region major number, a region minor number, and an offset of the first marker within a chunk that stores information about the log.

14. The method of claim 8, further comprising:

maintaining, by the system, a second marker that identifies a second location that was last successfully-parsed for the first client in a second partition of the log.

15. A non-transitory computer-readable medium comprising instructions that, in response to execution, cause a system comprising a processor to perform operations, comprising:

registering a first client, a second client, and a third client to respectively receive information about updates to a write-ahead log structured storage engine that comprises a log;

reading an entry in the log, the entry being of an update type, to enable centralized journal parsing by scaling up a number of clients without modifying resource usage;

in response to determining that the first client is registered to receive at least some of the information about updates that are of the update type, sending, to the first client, entry information about the entry;

in response to determining that the second client is registered to receive the information about updates that are of the update type, sending, to the second client, the entry information about the entry; and Maintaining a first marker that identifies a first location that was last successfully-parsed for the first client in a first partition of the log, wherein the first marker identifies a region major number within a chunk that stores information about the log.

16. The non-transitory computer-readable medium of claim 15, wherein the registering the first client to receive the information about updates comprises registering the first client to receive the at least some of the information about updates of the update type.

17. The non-transitory computer-readable medium of claim 16, wherein the update type is a first update type, and wherein the registering the first client to receive the at least some of the information about updates comprises:

registering the first client to receive the at least some of the information about a subset of possible update types.

18. The non-transitory computer-readable medium of claim 15, wherein the operations further comprise:

in response to determining that the third client is not registered to receive the at least some of the information about updates that are of the update type, determining to refrain from the sending of the entry information to the second client.

19. The non-transitory computer-readable medium of claim 15, wherein the operations further comprise:

maintaining a first marker that identifies a first location that was last successfully-parsed for the first client in the log; and maintaining a second marker that identifies a second location that was last successfully-parsed for the second client in the log.

20. The non-transitory computer-readable medium of claim 19, wherein the first marker further identifies a region minor number and an offset of the first marker within the chunk that stores information about the log.

* * * * *